(12) United States Patent
Saiki et al.

(10) Patent No.: US 6,503,046 B1
(45) Date of Patent: Jan. 7, 2003

(54) APPARATUS AND METHOD FOR EXTRACTING A SINGLE BAR FROM A PLURALITY OF BARS

(75) Inventors: Akio Saiki, Hanishina-gun (JP); Mitsuyoshi Yamaguchi, Hanishina-gun (JP); Yoshimori Kondo, Hanishina-gun (JP)

(73) Assignee: Alps Tool Co., Ltd., Nagano (JP)

( * ) Notice: Subject to any disclaimer, the term of this patent is extended or adjusted under 35 U.S.C. 154(b) by 0 days.

(21) Appl. No.: 09/386,483

(22) Filed: Aug. 31, 1999

(30) Foreign Application Priority Data

Oct. 30, 1998 (JP) ............................... 10-310064

(51) Int. Cl.⁷ .................................. B25J 1/06
(52) U.S. Cl. ............... 414/730; 414/745.1; 414/745.5; 414/745.7
(58) Field of Search .............. 414/745.1, 745.5, 414/745.6, 745.7, 730; 198/481.1, 550.5, 624, 803.14; 30/134

(56) References Cited

U.S. PATENT DOCUMENTS

| 3,871,288 A | * | 3/1975 | White | 414/745.7 |
| 4,140,226 A | * | 2/1979 | Richter | 214/1 BD |
| 4,362,460 A | * | 12/1982 | Penddinghaus | 414/745.7 |
| 4,376,340 A | * | 3/1983 | Ramun et al. | 30/134 |
| 4,557,661 A | * | 12/1985 | Fischer et al. | 414/730 |
| 4,732,066 A | * | 3/1988 | Del Fabro et al. | 414/745.7 |
| 4,997,334 A | * | 3/1991 | Shimura | 414/745 |
| 5,378,033 A | * | 1/1995 | Guo et al. | 294/116 |

FOREIGN PATENT DOCUMENTS

| DE | 2 257 609 | | 5/1974 | |
| DE | 2257390 | * | 6/1974 | 414/745.7 |
| DE | 24 14 960 | | 7/1975 | |
| DE | 219 453 A1 | | 3/1985 | |
| EP | 0 171 851 | | 2/1986 | |
| SU | 1708725 | * | 1/1992 | 414/745.1 |

* cited by examiner

Primary Examiner—Joseph A. Fischetti
(74) Attorney, Agent, or Firm—Nixon & Vanderhye (57) ABSTRACT

An apparatus for extracting a single bar from a plurality of bars, comprises a holding device for nipping the single bar. The holding device comprises nipping-members, which face each other and are capable of being opened and closed. The nipping members have a taper space formed therebetween so that only a single bar locating in a peak portion of the taper space of a plurality of bars received therein can be nipped.

7 Claims, 12 Drawing Sheets

APPARATUS AND METHOD FOR EXTRACTING A SINGLE BAR FROM A PLURALITY OF BARS

BACKGROUND OF THE INVENTION

1. Field of the Invention

The present invention relates to an apparatus and a method for extracting a single bar from a plurality of bars.

2. Description of the Related Art

In the conventional bar working process, a working is carried out for each of bars. When bars are gathered, it is necessary to extract a single bar from the bars.

The extract of the single bar from the bars has conventionally been carried out by hand or with the use of an apparatus having a complicated mechanism. Japanese Patent Provisional Publication No. S58-43,272 discloses an apparatus, which permits to extract the single bar from the bars (hereinafter referred to as the "prior art 1"). In the apparatus of the prior art 1, a holding device has a groove formed in the longitudinal direction of the single bar to be extracted so that only the single bar can be nipped in the groove. A conduit, which is connected to a suction means, communicates with the groove so that only the single bar can be sucked by means of the suction means.

Japanese Utility Model Provisional Publication No. H7-43,427 also discloses an apparatus, which permits to extract a single bar from bars (hereinafter referred to as the "prior art 2"). The apparatus of the prior art 2 is provided with (1) a stock on which bars are placed, (2) a sorting table on which a plurality of sorting means are disposed in series and (3) a nipping means for nipping the bar. According to the prior art 2, the single bar is sorted out from the bars and then extracted.

However, in the prior art 1, a suction device serving as the suction means is required to be installed, leading to a complicated and large-scaled structure of the apparatus.

In the prior art 2, a device and a process for sorting the single bar from the bars are required to extract the single bar, leading to a complicated structure of the apparatus and requiring a long period of time for extraction of the single bar.

SUMMARY OF THE INVENTION

An object of the present invention, which was made in order to solve the above-mentioned problems, is therefore to provide an apparatus and a method, which permits to extract easily and surely a single bar from bars with the use of a simple mechanism.

In order to attain the aforementioned object, an apparatus of the present invention for extracting a single bar from a plurality of bars, which comprises a holding device for nipping said single bar;

characterized in that:

said holding device comprises nipping members, which face each other and are capable of being opened and closed, said nipping members having a taper space formed therebetween so that only a 'single bar locating in a peak portion of said taper space of a plurality of bars received therein can be nipped.

According to the above-mentioned apparatus of the present invention, it is possible to extract the single bar merely by closing the nipping members to hold the bars between them, thus leading to an extremely simple structure of the apparatus.

The holding device and the plurality of bars may be movable relative to each other so that the holding device can receive the plurality of bars.

According to such a construction, it is possible to close, while detaching the holding device and the bars from each other, the nipping members of the holding device, so as to nip the single bar, permitting an effective extraction of the single bar.

The holding device may comprise a pair of the nipping members, which are swingably connected at a single point with each other.

According to such a construction, it is possible not only to reduce the distance between the nipping members, but also to change an angle between them by closing the nipping members, with the result that the single bar can easily move into the peak portion of the taper space.

The holding device may comprise a pair of the nipping members, which are swingably supported separately from each other.

According to such a construction, it is possible to change an angle formed between the nipping members, with the result that the single bar can easily move into the peak portion of the taper space.

The holding device may comprise a pair of the nipping members, which are disposed so as to linearly move to approach each other.

According to such a construction, there can be formed between the nipping members the taper space in which the single bar can be nipped.

Each of the nipping members may be swingable around a center of its swing motion, locating in a longitudinal one end of the nipping member.

According to such a construction, it is possible to form the taper space between the nipping members in their closing condition, while they are placed in parallel with each other in their opening condition.

The above-mentioned apparatus may further comprise:

a receiver for receiving said plurality of bars, said receiver having opposite ends in a longitudinal direction of said receiver, said holding device being disposed at one of said opposite ends, and the other of said opposite ends having a width longer than said one of said opposite ends.

According to such a construction, it is possible to prevent entanglement of the bars during the steps of nipping the single bar by means of the holding device and separating the single bar from remaining bars, even when there is used bars having a diameter, by which the bars may easily be entangled with each other.

The above-mentioned apparatus may further comprise:

a sensor for obtaining a number and/or diameter of the bar received by said holding device; and a controller for making, on the basis of an output signal from said sensor, determination whether the number and/or diameter of the bar received by said holding device are correct or not, said controller controlling said holding device to release receipt of the bar and to receive the bar again when the number and/or diameter of the bar is determined to be incorrect.

According to such a construction, it is possible to extract surely the single bar having a prescribed diameter by repeating the nipping step, when the holding device erroneously nip at least two bars or a single bar having an inappropriate diameter different from that of the other bars, which is included therein.

The holding device may be disposed movably.

The holding device may be disposed swingably in the direction perpendicular to the longitudinal direction of the bars.

The holding device may be disposed slidably in the direction perpendicular to the longitudinal direction of the bars.

According to such constructions of the holding device, it is possible to move the single bar nipped by the holding device to a device for carrying out a subsequent step.

The apparatus may further comprise a bar separating and discharging device for separating the single bar nipped by the holding device from remaining bars, and discharging the single bar from the apparatus.

The bar separating and discharging device may comprise a bar separating and discharging member having an inclined portion inclining outward and downward, the bar separating and discharging member being movable from one end of the single bar nipped by the holding device, which is provided at a side of the one end, to the other end thereof, while coming into contact with a lower surface of the single bar.

The bar separating and discharging device may comprise (1) a bar separating device for separating the single bar nipped by the holding device from the remaining bars and (2) a bar discharging device separately provided from the bar separating device, for discharging the single bar; the bar separating device may have a bar separating member, which is movable from one end of the single bar nipped by the holding device, which is provided at a side of the one end, to the other end thereof, while coming into contact with a lower surface of the single bar; and the bar discharging device may have a bar discharging member, which inclines outward and downward, and is swingable.

According to such structures of the bar separating and discharging device, it is possible to surely separate the single bar nipped by the holding device, which may be entangled in the remaining bars, so as to supply the single bar to a device for carrying out a subsequent step.

A method of the present invention for extracting a single bar from a plurality of bars comprises the steps of:

providing a holding device having nipping members, which face each other and are capable of being opened and closed, so that a taper space is formed between said nipping members;

moving one of said holding device and said bars relative to the other of said holding device and said bars so that said bars are received in said taper space; and closing said nipping members to hold said bars therebetween so as to nip only a single bar locating in a peak portion of said taper space of said bars.

According to the above-mentioned method of the present invention, it is possible to extract the single bar merely by closing the nipping members of the holding device, leading to a simple construction of an apparatus for carrying out the method of the present invention. It is also possible to close, while detaching the holding device and the bars from each other, the nipping members of the holding device, so as to nip the single bar, permitting an effective extraction of the single bar.

The method of the present invention may further comprises the step of providing a sensor for detecting a number or diameter of said bars so that a detection beam for said sensor intersects a locus of a relative movement of said holding device and said bars, thus preventing malfunction of said holding device.

According to such an optional step, it is possible. to nip appropriately the single bar having a prescribed diameter utilizing the sensor, which detects the number or diameter of the bars.

The holding device may be controlled, based on malfunction signals from the sensor, to relieve a nip of the single bar to cause it to fall, and to nip the other single bar again.

According to such control of the holding device, it is possible to extract surely and appropriately the single bar from the bars without causing an incorrect extraction of the bar, even when a bar having a different diameter is included in the bars.

The method of the present invention may further comprises the step of moving the holding device together with the single bar, after a nip thereof.

The above-mentioned moving step of the holding device may comprise causing the holding device to swing in a direction perpendicular to a longitudinal direction of the single bar.

The above-mentioned moving step of the holding device may comprise causing the holding device to slide in a direction perpendicular to a longitudinal direction of the single bar.

According to such optional moving steps, it is possible to move the single bar to a place in which the single bar can easily be supplied to a device for carrying out a subsequent step.

The method of the present invention may further comprise the step of moving, after a nip of the single bar by the holding device, a bar separating and discharging member having an inclined portion inclining outward and downward, from one end of the single bar nipped by the holding device, which is provided at a side of the one end, to the other end thereof, while coming into contact with a lower surface of the single bar, thereby separating and removing the single bar from remaining bars.

The method of the present invention may further comprises the step of (1) moving, after a nip of the single bar by the holding device, a bar separating member from one end of the single bar nipped by the holding device, which is provided at a side of the one end, to the other end thereof, while coming into contact with a lower surface of the single bar, so as to separate the single bar from remaining bars; and then, (2) swinging a bar discharging member having an inclined portion inclining outward and downward to place, while releasing a nip of the single bar by the holding device, the single bar onto the bar discharging member and to move the single bar outward, thereby discharging the single bar from the apparatus.

According to such optional steps, it is possible to surely separate the single bar nipped by the holding device, which may be entangled in the remaining bars, so as to supply the single bar to a device for carrying out a subsequent step.

DETAILED DESCRIPTION OF THE PREFERRED EMBODIMENTS

Now, embodiments of an apparatus and method of the present invention for extracting a single bar from a plurality of bars will be described in detail below with reference to the accompanying drawings.

Figure 1:
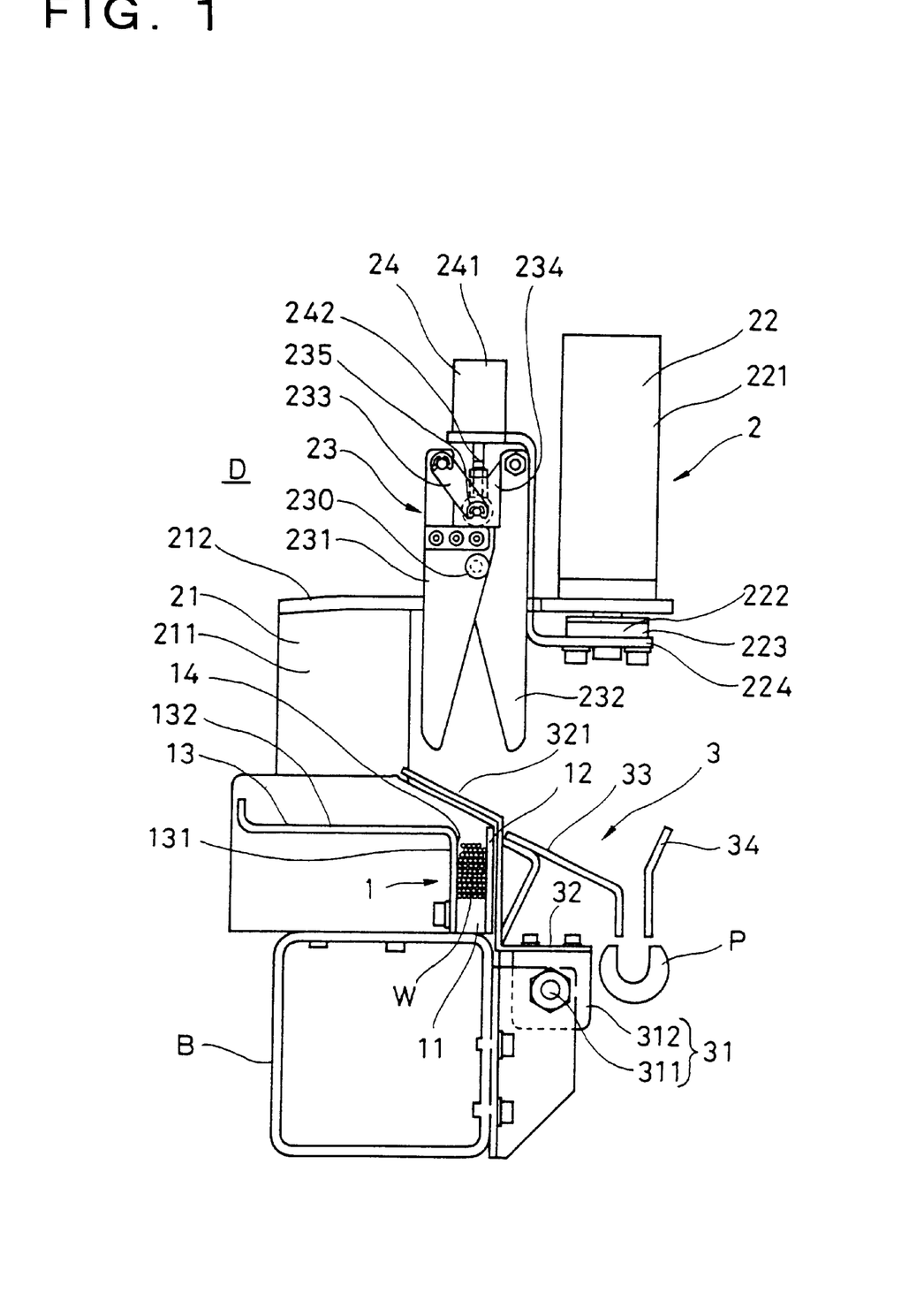
FIG. 1 is a side view illustrating a bar extraction apparatus of the first embodiment of the present invention.
Figure 2:
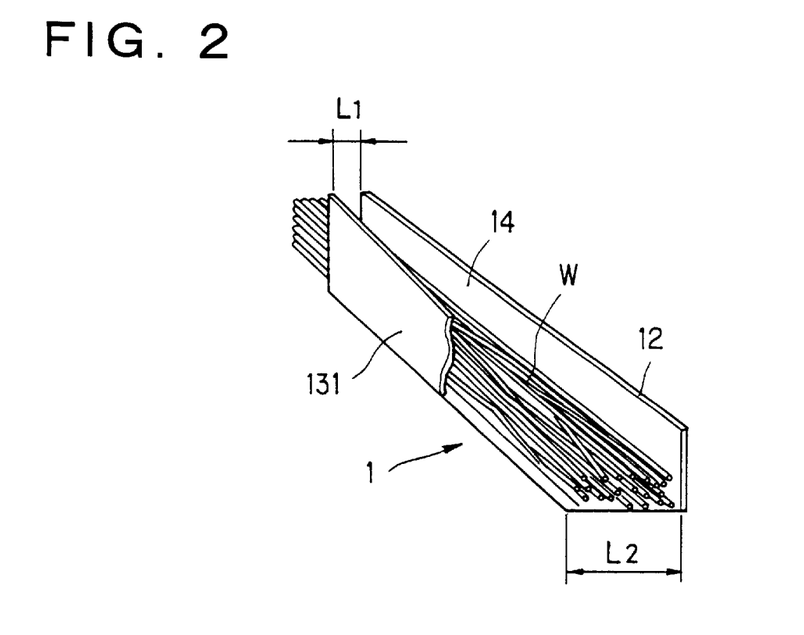
FIG. 2 is a perspective view illustrating a receiving groove for receiving bars, which is provided by the bar extraction apparatus as shown in FIG. 1.

FIGS. 1 and 2 show a bar extraction apparatus D of the first embodiment of the present invention. The bar extraction apparatus D comprises a base B, a receiver 1, a holding device 2 and a bar separating and discharging device 3. The base B is formed of shape steel, which has a sufficient strength for supporting the entirety of the apparatus, substantially into a square shape in a cross-section perpendicular to the longitudinal direction (i.e., the direction perpendicular to the sheet of FIG. 1) of the base B. The receiver 1 is mounted on the upper surface of the base B. The receiver 1 receives a plurality of bars W···W. The holding device 2 is supported on one end side in the longitudinal direction of the base B. The holding device 2 extracts a single bar 1 from a plurality of bars W···W. The bar separating and discharging device 3 is disposed at a side of the base B. The bar separating and discharging device 3 separates the extracted single bar from the remaining bars W···W and supply it to a guide pipe P of a bar supply device (not shown), which locates in the vicinity of the apparatus.

The receiver 1 is composed of a bottom portion 11, a stopper 12 having a plate-shape, and a bar supply plate 13. The bottom portion 11 is disposed so as to extend along the edge portion of the upper surface of the base B, which edge portion locates in the side of the bar separating and discharging device 3. The bottom portion 11 bears the bars W···W from the lower side thereof. The stopper 12 is fixed to one side surface of the bottom portion 11, for preventing the bars W···W from tumbling down toward the bar separating and discharging device 3. The bar supply plate 13 is formed of a thin plate into an L-shape and fixed to the other side surface of the bottom portion 11, for supplying the bars W···W into the receiver 1. The bottom portion 11, the stopper 12 and a vertical wall portion 131 of the bar supply plate 13, which is fixed to the bottom portion 11, form a receiving groove 14. The bars W···W are received in the receiving groove 14 so as to be stacked up. One end portion, at the side of which the holding device 2 is disposed, of each of the bars W···W projects outside from the end of the receiving groove 14 (see FIG. 11). The bar supply plate 13 has a bar guide surface 132, which extends horizontally from the upper end of the vertical wall portion 131 to the opposite side to the bar separating and discharging device 3.

The receiving groove 14 of the receiver 1 is formed in a taper shape as shown in FIG. 2 so that the width L1 of the receiving groove 14 at one end of the receiver 1 in its longitudinal direction is smaller than the width L2 thereof at the other end of the receiver 1. The holding device 2 is disposed at the side of the above-mentioned one end of the receiver 1. The taper-shape of the receiving groove 14 in the horizontal plane makes it possible to disentangle the bars at the side of the above-mentioned other end of the receiver 1, permitting an easy extraction of the single bar W. In replacement of the bottom portion 11 mentioned above, there may be used a rectangular bottom portion (not shown) having substantially the same width of the opposite ends in its longitudinal direction. In this case, a partition is formed on the intermediate portion in the width direction of the bottom portion at the side of the above-mentioned one end of the receiver 1 so that the one ends of the bars can be received between the partition and the vertical wall portion of the bar supply plate.

The holding device 2 comprises a bracket 21, a first air cylinder 22, a pair of nippers 23 and a second air cylinder 24. The bracket 21 is fixed to the one end of the base B so as to project upward, for supporting the holding device 2. The first air cylinder 22 has a rectangular parallelepiped-shape and moves the pair of nippers 23 up and down. The lower portion of the first air cylinder 22 is fixed to the bracket 21. The pair of nippers 23 are formed into a shape of a pair of scissors to nip the bar W. The pair of nippers 23 can be moved up and down by means of the first air cylinder 22. The second air cylinder 24 has a rectangular parallelepiped-shape and causes open and close nipping members 231, 232 of the pair of nippers 23. The second air cylinder 24 is connected through a link mechanism 233 to the upper ends of the nipping members 231, 232.

The bracket 21 is composed of a vertical portion 211 and a horizontal portion 212. The vertical portion 211 has a flat plate shape, and is fixed on the upper surface of the base B by means of fastening device such as bolts so as to extend upward. The horizontal portion 212 projects horizontally from the upper end of the vertical portion 211 toward the bar separating and discharging device 3. The first air cylinder 22 is fixed to the horizontal portion 212.

The first air cylinder 22 is provided with a tube 221 having a rectangular parallelepiped-shape and with a cylinder rod 222, which can slide in the inside of the tube 221 in its longitudinal direction. The first air cylinder 22 is fixed to the front end of the horizontal portion 212 of the bracket 21 so that the lower end 223 of the cylinder rod 222 locates below the bracket 21. The lower end 223 of the cylinder rod 222 is provided with a bracket 224, which is bent into a Z-shape, for mounting the pair of nippers. The pair of nippers 23 is fixed to the cylinder rod 222 by the bracket 224 so as to locate right above the receiving groove 14.

The pair of nippers 23 is composed of two nipping members 231, 232, which have tip portions formed into a taper and are swingably connected with each other at the supporting portion 230 for the swing motion, locating in the intermediate portions of the nipping members 231, 232 in their longitudinal direction (i.e., the vertical direction in FIG. 1). The pair of nippers 23 is mounted so that the tip portions of the nipping members 231, 232 are directed downward. The upper ends of the nipping members 231, 232 are connected swingably with front ends of links 233, 234, respectively. The rear ends of the links 233, 234 are connected swingably with each other at a connection portion 235 locating in the center of the pair of nippers 23 in its width direction (i.e., the horizontal direction in FIG. 1).

The pair of nippers 23 is provided with the second air cylinder 24 for opening and closing the nipping members 231, 232. The second air cylinder 24 is provided with a tube 241 having a rectangular parallelepiped-shape and with a cylinder rod 242, which can slide in the inside of the tube 241 in its longitudinal direction. The front end of the cylinder rod 242 is connected to the connection portion 235 of the links 233, 234, which are connected to the pair of nippers 23. The nipping members 231, 232 swing around the supporting portion 230 for the swing motion relative to each other by moving the cylinder rod 242 up and down, thus performing the open and close motion of the pair of nippers 23. As is clear from the figure, the space formed between the nipping members 231, 232 has a triangular shape. More specifically, a taper space is formed so that its tip end is directed upward. In the embodiment of the present invention, the pair of nippers 23 can be moved up and down by means of the first air cylinder 22 and can be opened and closed by means of the second cylinder 24 and the links 233, 234. The present invention is not limited to such actuating mechanisms. A transmission device, which includes a belt or a chain driven by a motor, or a combination of a feed screw and a gear train may be utilized as the above-mentioned actuating mechanisms.

The bar separating and discharging device 3 serving as the bar separating and discharging device comprises a rod 311, a cylinder mechanism 31, a bar separating and discharging member 32, a guide member 33 and a plate 34. The rod 311 extends along the side edge of the base B (see FIG. 11). The cylinder mechanism 31 has a movable body 312 through which the rod 311 passes so that the movable body 312 can move along the rod 311. The bar separating and discharging member 32 is formed from a thin sheet into a bent shape and mounted on the upper portion of the movable body 312. The guide member 33 guides the single bar W held by the holding device 2 to the guide pipe P. The plate 34 is formed of a plate into an L-shape and prevents the guided bar W from falling to the opposite side to the guide pipe P. The bar separating and discharging member 32 is provided with an inclined surface 321 inclining outward and downward. The bar separating and discharging member 32 is not limited to the above-described member formed of the thin sheet and a member formed from a long bar-shaped material into a bent shape may be used as the bar separating and discharging member 32.

According to the bar separating and discharging device 3, the inclined surface 321 of the bar separating and discharging member 32 can move in the longitudinal direction of the base (i.e., the direction perpendicular to the sheet of FIG. 1), while coming into contact with the lower surface of the single bar held by the holding device 2. Such movement of the inclined surface 321 permits to separate completely the single bar from the remaining bars W···W received in the receiver 1, even when the single bar entangles with the remaining bars, and to supply the single bar to the bar supply device (not shown), which locates in the vicinity of the apparatus.

Now, with reference to FIGS. 3 to 11, description will be given below of operation of the holding device 2 when extracting the single bar W from the plurality of bars W···W.

Figure 3:
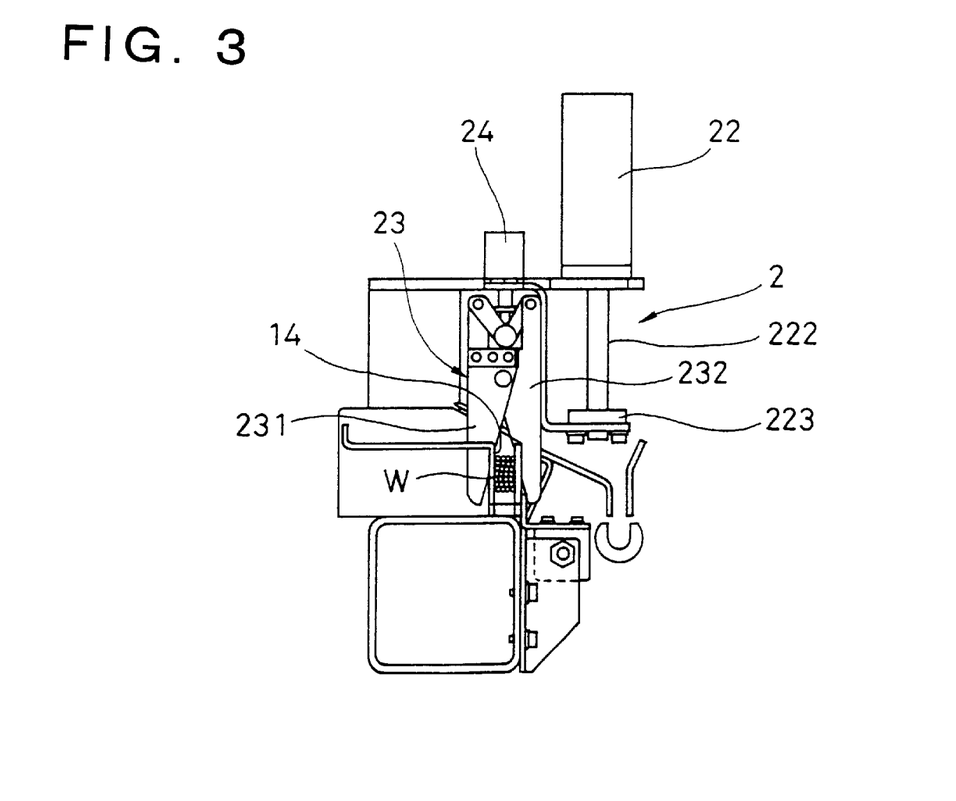
FIG. 3 is a side view of the bar extraction apparatus, illustrating a step for receiving the bars in a holding device so that nipping members of the holding device straddle the bars.
Figure 4:
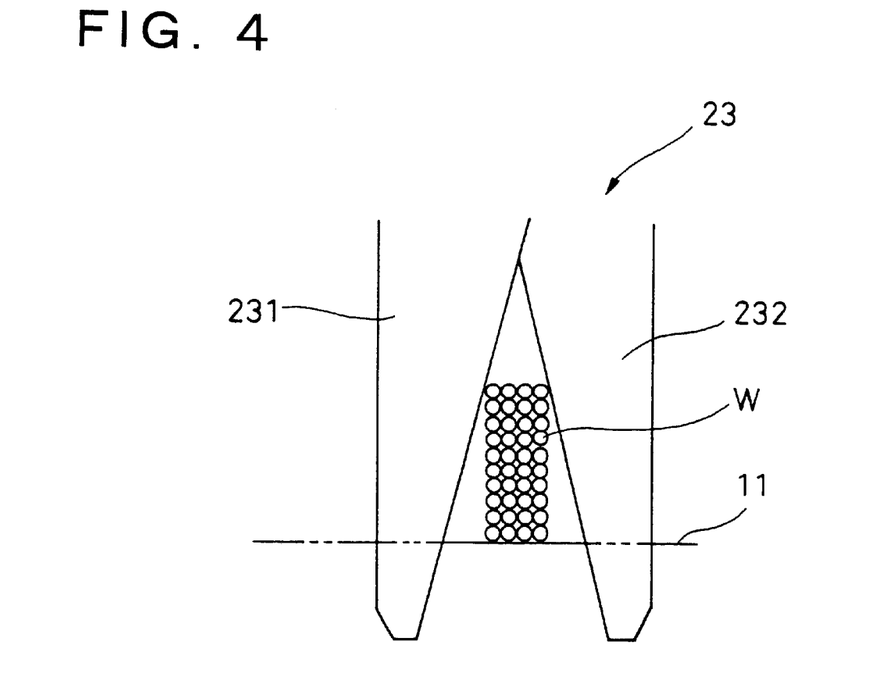
FIG. 4 is an enlarged view of tip end portions of the nipping members as shown in FIG. 3.
Figure 5:
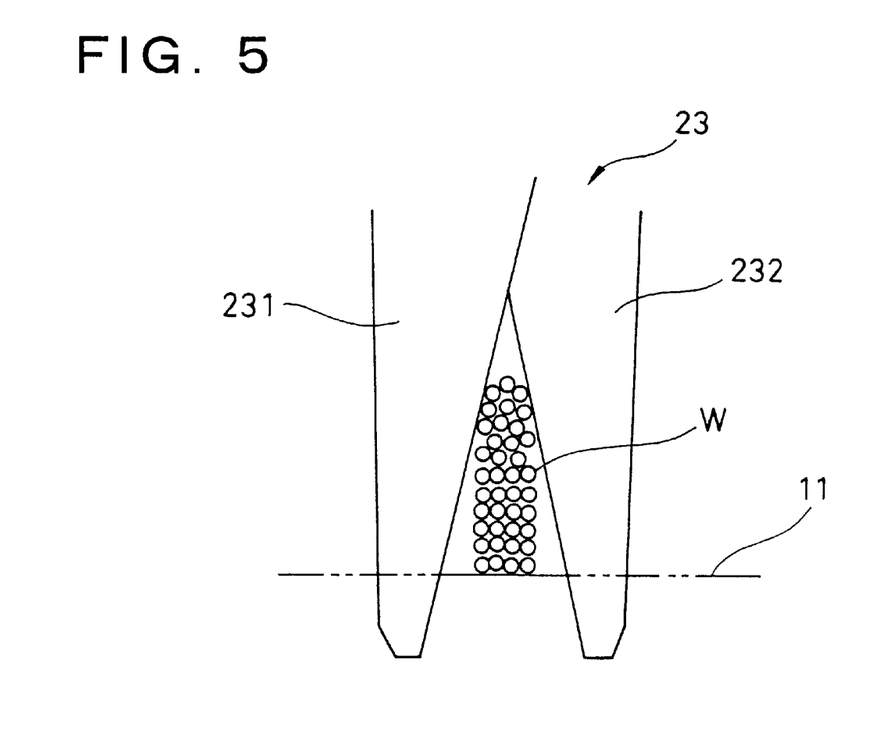
FIG. 5 is an enlarged view of the tip end portions of the nipping members, illustrating a condition in which the nipping members are lifted, while closing slightly them from the condition as shown in FIG. 4.
Figure 6:
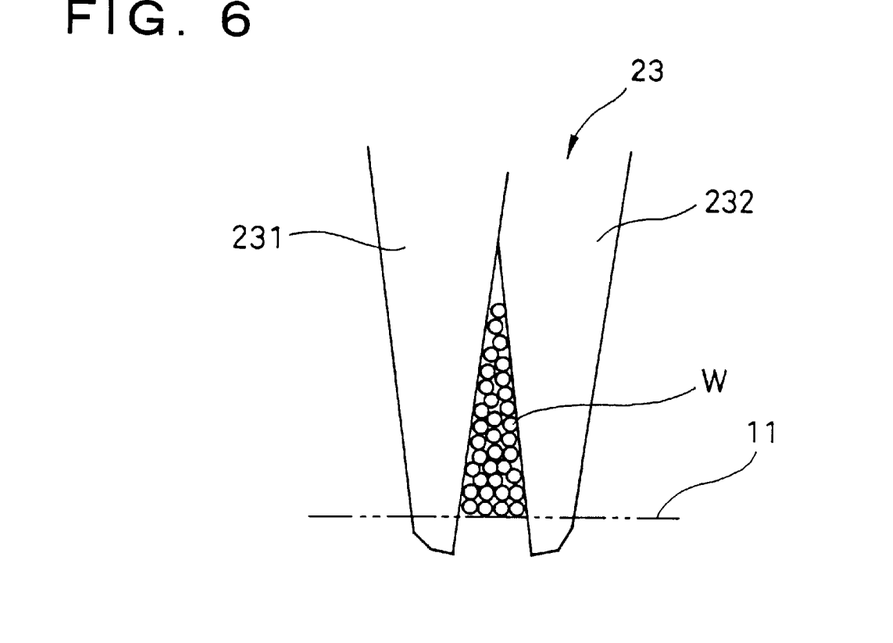
FIG. 6 is a view illustrating the moving condition of the bars when the nipping members are further lifted, while closing further slightly them from the condition as shown in FIG. 5.
Figure 7:
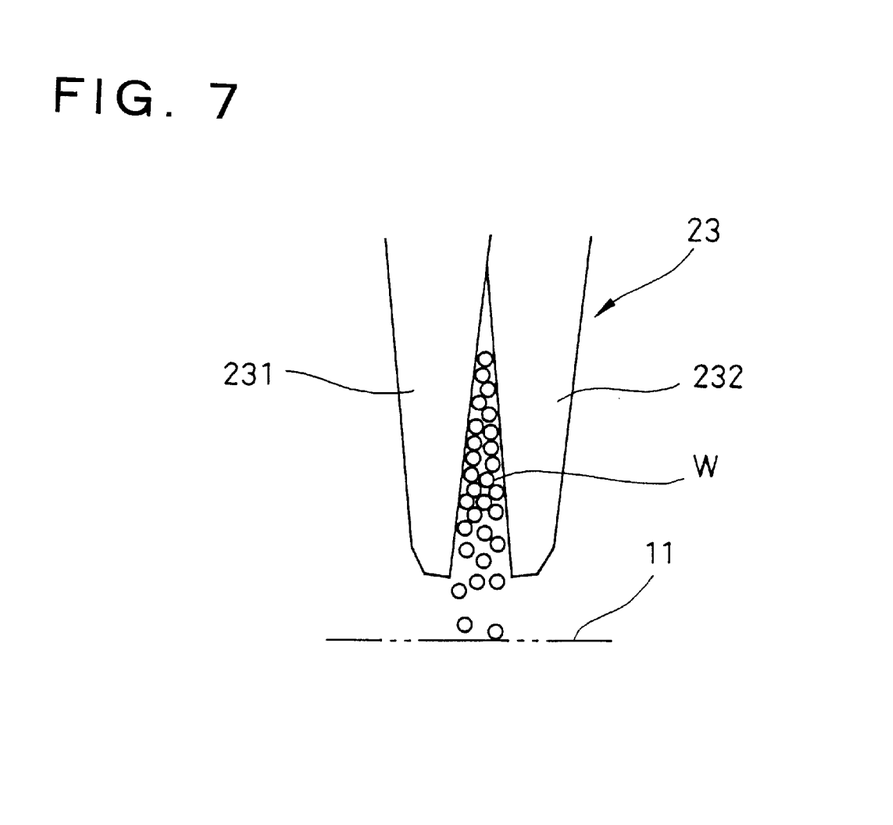
FIG. 7 is a view illustrating a condition in which bars locating in the lower portion of the taper space of the nipping members fall.
Figure 8:
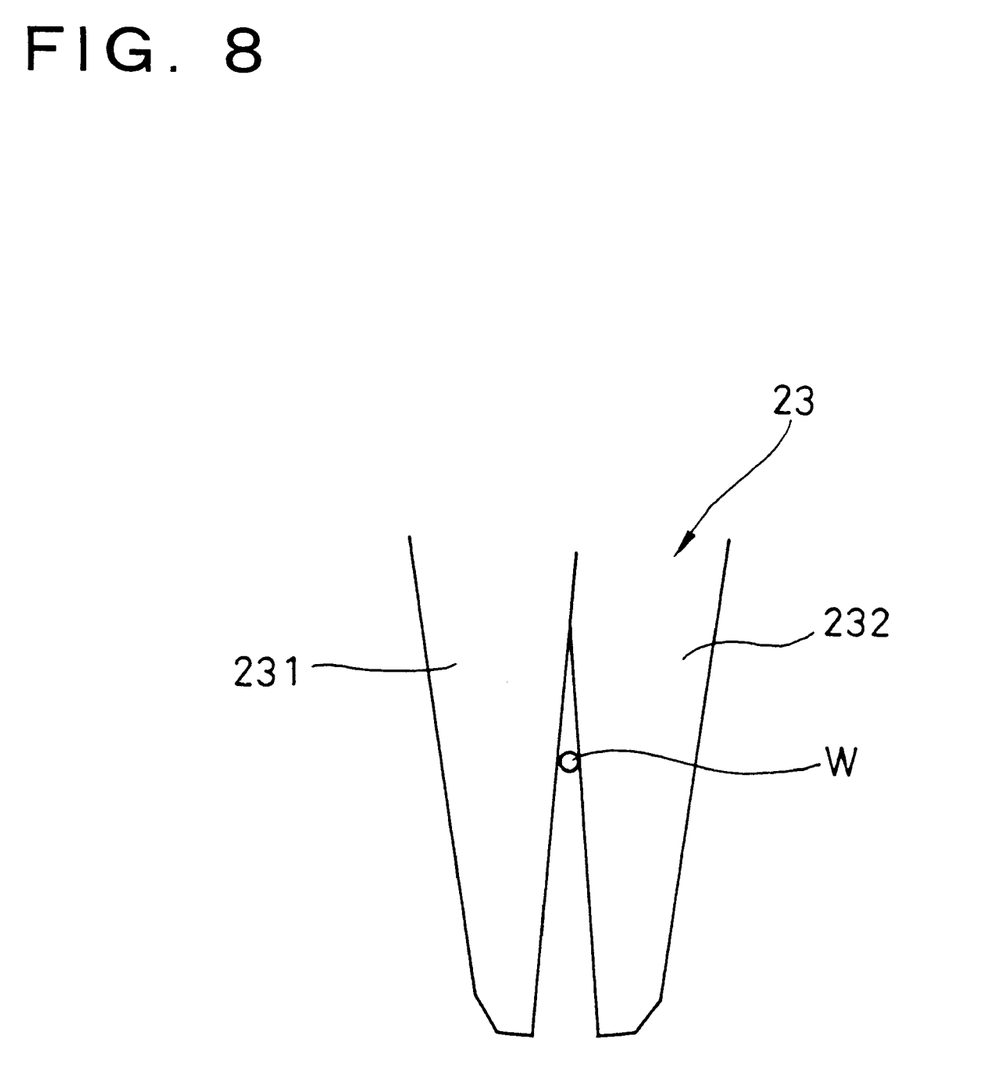
FIG. 8 is a view illustrating a condition in which only the single bar of the bars, which locates in the peak portion of the taper space of the nipping members remains and is nipped by the nipping members.
Figure 9:
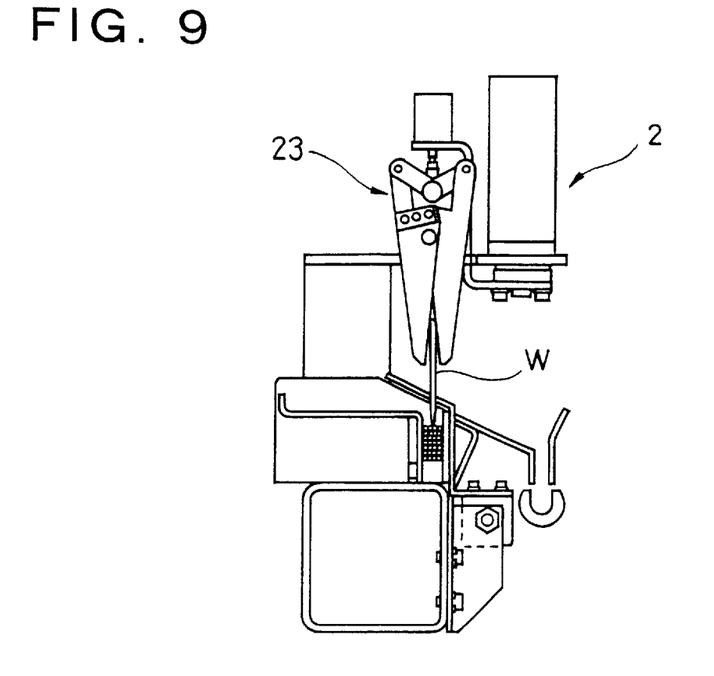
FIG. 9 is a side view of the bar extraction apparatus, illustrating a condition in which the nipping members of the holding device nip the single bar.
Figure 10:
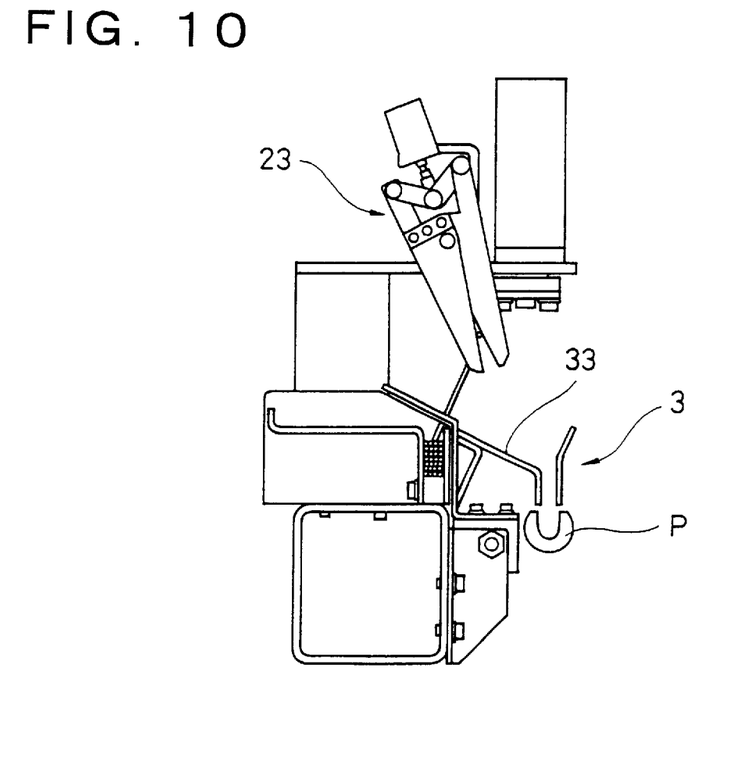
FIG. 10 is a side view of the bar extraction apparatus, illustrating a condition in which the nipping members of the holding device swing toward a guide pipe.

First, the cylinder rod 222 of the first air cylinder 22 of the holding device 2 lowers until the nipping members 231, 232 reach the position in which one end of each of the bars W···W projects outside from the end of the receiving groove 14, which receives the bars W···W, so that the bars W···W are received at their end portions in the taper space formed between the nipping members 231, 232 (see FIGS. 3 and 4). Then, the cylinder rod 242 of the second air cylinder 24 slides to retract into the tube 241 so that the nipping members 231, 232 are closed to press the bars W···W, and the nipping members 231, 232 are simultaneously and gradually lifted up (see FIG. 5). Restriction of the bars W···W by means of the bottom portion 11 of the receiver 1 and the nipping members 231, 232 causes the bars locating in the upper region of a bundle of bars W···W to gradually move upward so that an angle of the taper space becomes smaller (see FIG. 6). When the further closing step and the gradual lifting step of the nipping members 231, 232 are simultaneously carried out, the bars locating in the lower region of the above-mentioned bundle of bars W···W fall in the receiver 1 to return therein. Although a few bars exist in the vicinity of the peak portion of the taper space during the lifting step (see FIG. 7), only the single bar W finally remains in the peak portion of the taper space so that the single bar W can be nipped in the peak portion of the taper space formed between the nipping members 231, 232 (see FIGS. 8 and 9). Then, the lower portion of the pair of nippers 23 swings toward the guide pipe P so as to permit the nipped bar W to drop easily onto the guide member 33 (see FIG. 10). Finally, the movable body 312 having the bar separating and discharging member 32 moves along the rod 311 from the one end thereof, at the side of which the holding device 2 is disposed, to the other end thereof, so as to separate the single bar W from the other bars W···W. The single bar W thus separated is discharged from the bar extraction apparatus D and is supplied into the guide pipe P (see FIG. 1).

In the above-described embodiment of the present invention, the pair of nippers 23 swings. The present invention is not limited to such an embodiment and the bar may be moved by sliding the pair of nippers 23 in the direction perpendicular to the longitudinal direction of the bar. However, the bar may be moved in the oblique direction relative to the longitudinal direction of the bar so long as the bar moves parallelly.

Figure 11:
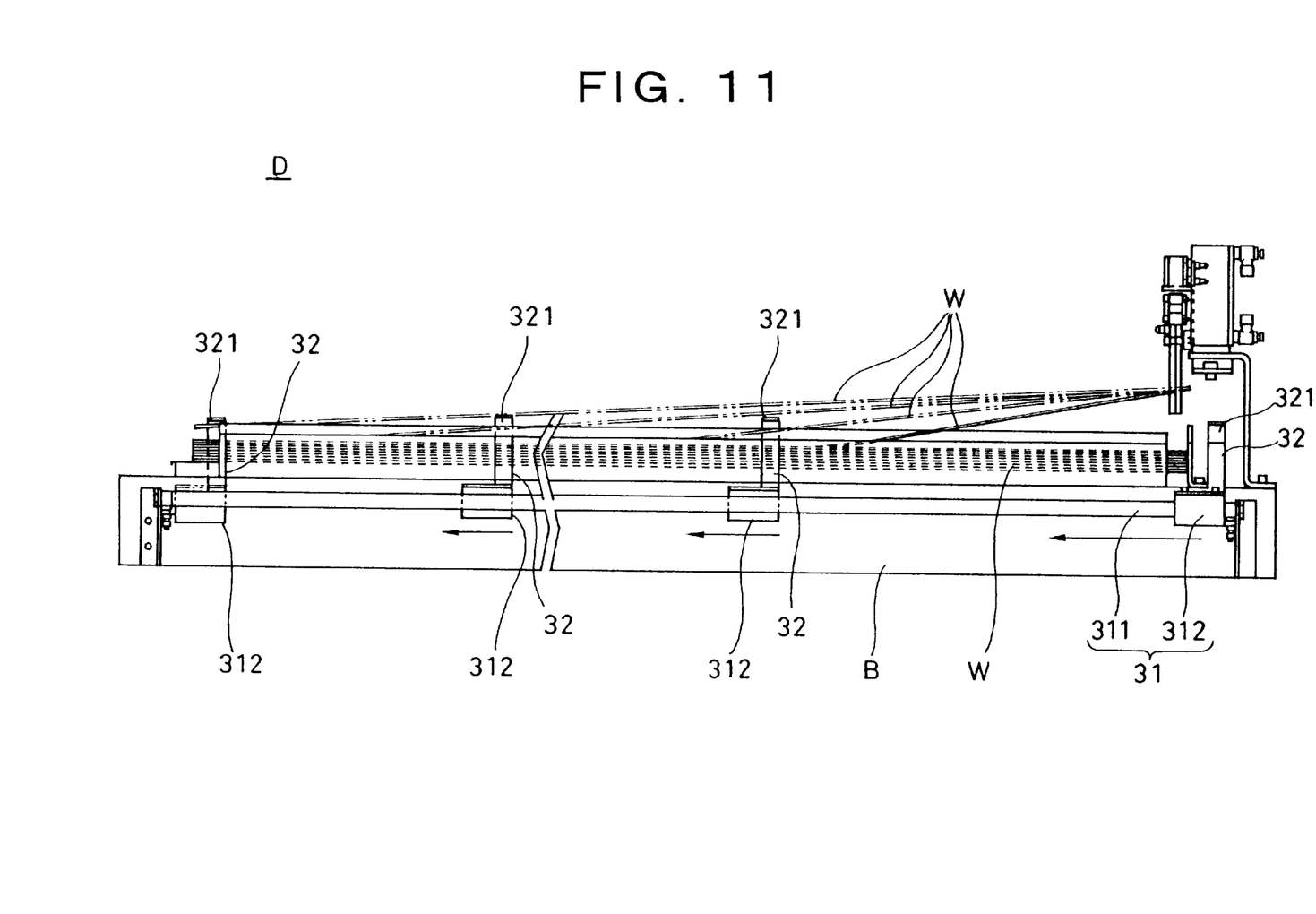
FIG. 11 is a front view of the bar extraction apparatus, illustrating a condition in which the single bar is separated and discharged from the bars by means of a bar separating and discharging device.
Figure 12:
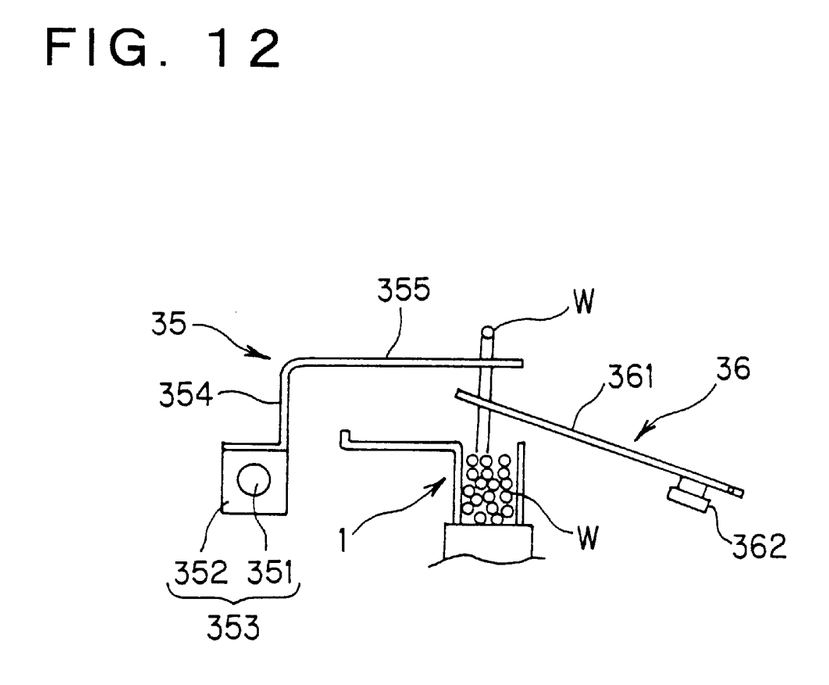
FIG. 12 is a schematic view of a modification of the bar separating and discharging device as shown in FIG. 11, which is viewed in the longitudinal direction of the bars.
Figure 13:
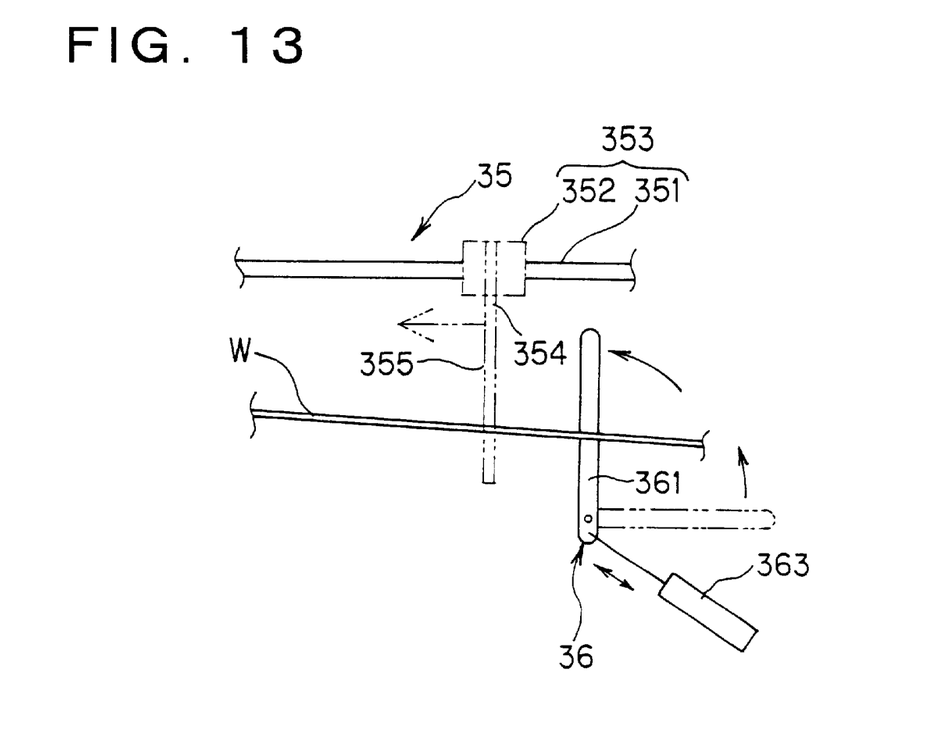
FIG. 13 is a plan view of the bar separating and discharging device as shown in FIG. 12.

The bar separating and discharging device is not limited to the structure as shown in FIG. 11. The separating and discharging step of the bar may be carried out with the use of a modification of the bar separating and discharging device as shown in FIGS. 12 and 13. The modification is composed of (1) a bar separating device 35 serving as a bar separating device for separating the single bar W nipped by the pair of nippers from the remaining bars W···W and (2) a bar discharging device 36 separately provided from the bar separating device 35, for discharging the separated bar W from the bar extraction apparatus.

The bar separating device 35 is provided with a moving mechanism 353, which has (1) a rod 351 disposed on the side surface of the base along the longitudinal direction of the bar (i.e., the direction perpendicular to the sheet of FIG. 12) and (2) a movable body 352 movable along the rod 351. There is mounted on the upper surface of the movable body 352 an L-shaped bar separating member 354 having a bar separating portion 355, which extends horizontally in the direction perpendicular to the longitudinal direction of the bar W, for separating the bar. According to the bar separating device 35, the movable body 352 can move from the one end of the bar, at the side of which the holding device is disposed (see FIG. 11), to the other end thereof, while bringing the bar separating portion 355 into contact with the lower surface of the bar W, after the completion of the nip of the single bar W. Such movement of the bar separating device 35 permits to separate completely the single bar from the remaining bars W···W.

The bar-discharging device 36 is mounted on the side surface of the base, which is opposite to the bar-separating device 35. The bar discharging device 36 has a bar discharging member 361 formed of a flat bar. The bar-discharging member 361 inclines downward and outward of the bar extraction apparatus. The bar-discharging member 361 is swingably supported at its outer end portion by means of a supporting member 362. A cylinder 363 for swinging the bar-discharging member 361 is connected to the outer end of the bar-discharging member 361. The actuation of the cylinder 363 causes the bar-discharging member 361 to swing. The present invention is not limited to the use of such a cylinder and the bar discharging member 361 may be swung by means of a motor.

In order to discharge the bar W with the use of the above-described bar discharging device 36, the bar discharging member 361 swings, after the separation of the single bar by the bar-separating device 35, so that the bar W is placed on the bar discharging member 361 (i.e., from a condition shown in a two-dot chain line in FIG. 13 to another condition shown in a solid line therein), thus performing the discharging step. A plurality of bar discharging devices may be disposed in the longitudinal direction of the bar.

Figure 14A:
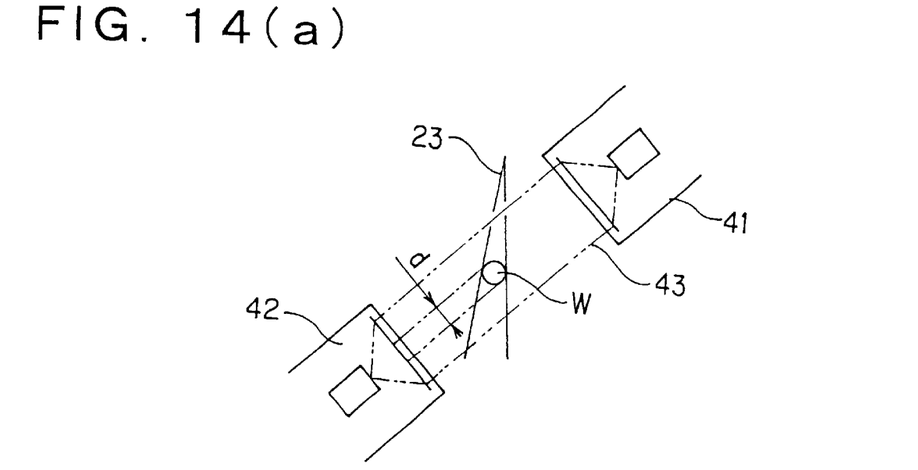
FIG. 14 is a view illustrating a sensor, with the use of which a step of detecting a number and diameter of the bars is carried out.
Figure 14B:
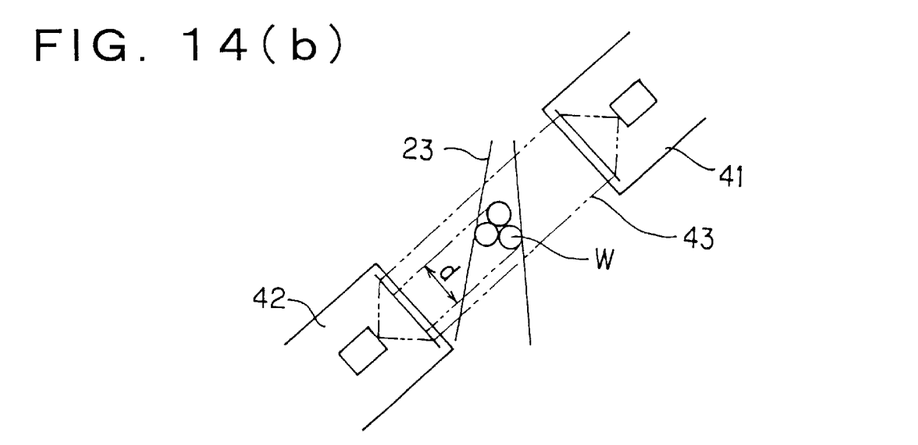
Figure 14C:
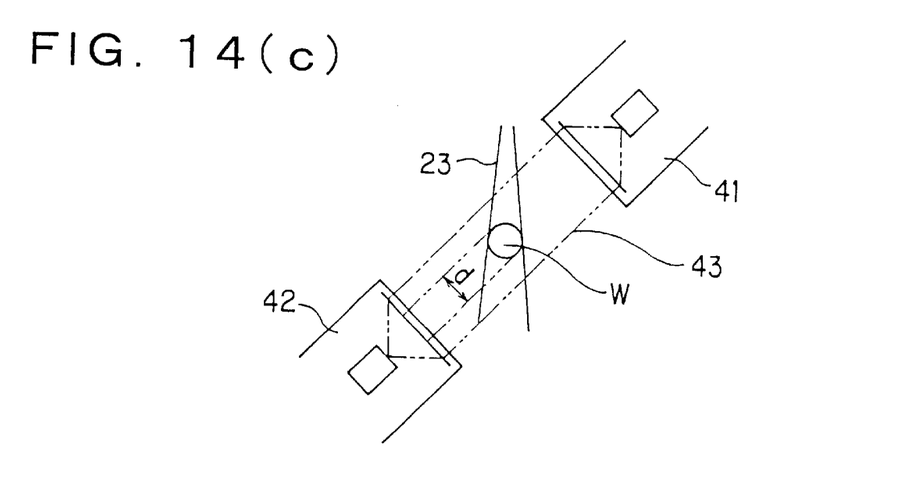

In the embodiment of the bar extraction apparatus of the present invention, there is applied a control system for causing the pair of nippers to nip surely the single bar having a prescribed diameter. According such a control system, there is determined whether the number and/or diameter of the bars are correct or not, and if the number and/or diameter of the bars are determined to be incorrect, the nip of an inappropriate bar is released and the nipping step is carried out again so as to nip surely the single bar having a prescribed diameter by means of the pair of nippers. FIGS. 14(a) to 14(c) show conditions in which a sensing step is carried out with the use of parallel rays-optical linear sensors 41, 42 to determine whether or not the bar W is nipped in an appropriate manner. The beam-emitting sensor 41 and the beam-receiving sensor 42 form a set of sensors. The beam-emitting sensor 41 emits a laser beam having a prescribed width to the beam-receiving sensor 42. In the embodiment of the present invention as shown in FIGS. 14(a) to 14(c), the laser beam 43 is obliquely emitted downward so as to maintain an angle of about 45 degrees between the direction of the laser beam 43 and the moving direction of the bar W nipped by the pair of nippers 23.

According to the parallel rays-optical linear sensors 41, 42, a width of an object between the beam emitting sensor 41 and the beam receiving sensor 42 can also be obtained by determining an amount of beam interrupted by the object and by outputting the thus determined amount of interrupted beam as voltage. Even when the object to be sensed moves, the movement of the object has no adverse effect on the determination of an amount of the interrupted beam.

FIG. 14(a) shows a condition in which the single bar W having a prescribed diameter is nipped. The pair of nippers 23 nips the bar W and is then lifted. During the lifting motion of the pair of nippers 23, the bar W intersects the laser beam 43 emitted from the beam emitting sensor 41 so as to interrupt the laser beam 43 by a width "d". When the pair of nippers 23 nips the single bar W having a prescribed diameter "d", the beam receiving sensor 42 outputs the voltage corresponding to an amount "d" of laser beam interrupted by the bar W. When the value of voltage thus output is identical with a predetermined value, the number and the diameter of the bar W are determined to be correct and the bar extraction apparatus continues to operate.

However, a plurality of bars W···W are nipped as shown in FIG. 14(b), an amount of laser beam interrupted increases. As a result, the value of output voltage is not identical with the predetermined value, a controller (not shown) determines that the apparatus operates in an inappropriate manner. In this case, the nip of the bars W···W is released to return them into the receiver (see FIG. 1). Then, the nipping step of the bar W is carried out again, thus permitting to nip surely the single gar W. When a bar having a different diameter is included in the bars W···W and that bar is nipped as shown in FIG. 14(c), an amount of laser beam interrupted also increases. In this case, the nip of the inappropriate bar is released to return it into the receiver. Then, the nipping step of the bar W is carried out again so as to prevent the malfunction.

The sensor used in the present invention is not limited to the parallel rays-optical linear sensor and there may be used a laser micrometer, an optical sensor, a magnetic sensor or other sensor.

Figure 15A:
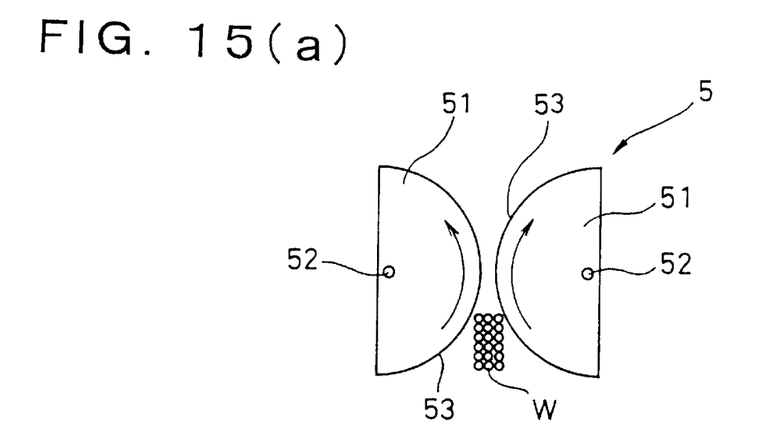
FIG. 15 is a view illustrating a modification of the nipping members of the holding device as shown in FIG. 1.
Figure 15B:
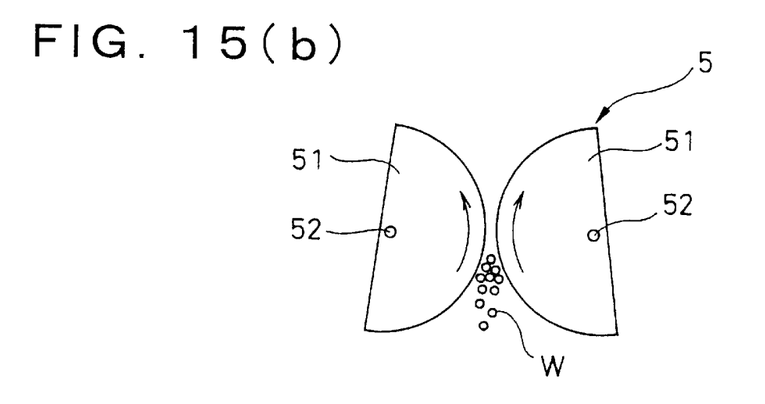
Figure 15C:
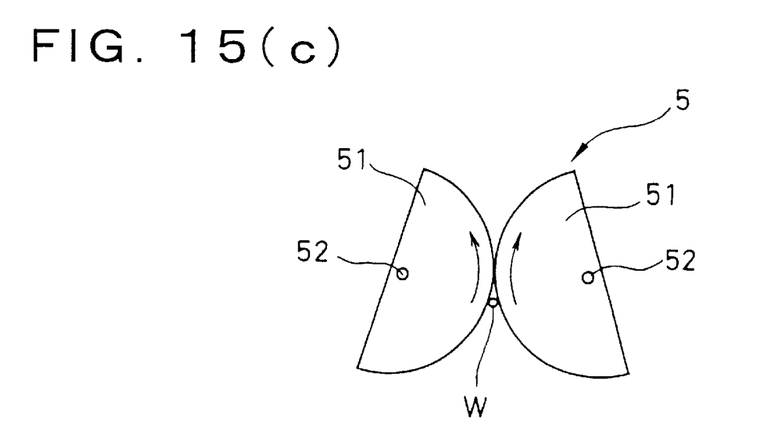

In the above-described embodiment of the present invention, the pair of nipping members are swingable connected at the single point with each other. The structure of the nipping members are not limited to the above-mentioned structure and a pair of cams 51, 51 may be used as the nipping members. More specifically, the pair of cams 51, 51 serving as the holding device 5 may be supported swingably by shafts 52, 52, respectively, so that the respective arcuate portions of the cams 51, 51 face each other, resulting in formation of the taper space between the cams 51, 51. In this case, the bars W···W are received in the taper space formed between the cams 51, 51 (see FIG. 15(a)) and the cams 51, 51 are lifted up while swinging them around the shafts 52, 52 so as to shorten gradually the distance between the cams 51, 51 (see FIG. 15(b)). The single bar W locating in the peak portion of the taper space finally remains and the other bars fall down (see FIG. 15(c)).

Figure 16:
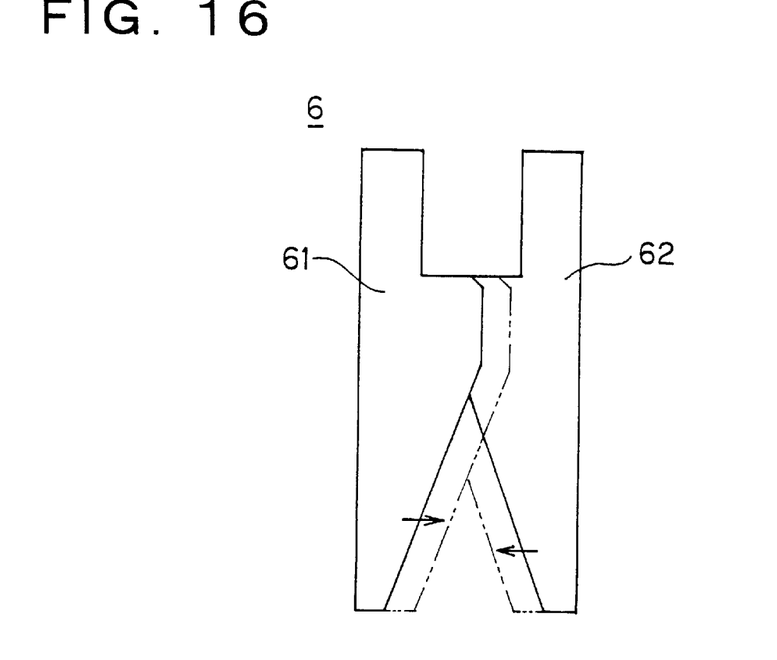
FIG. 16 is a view illustrating another modification of the nipping members of the holding device as shown in FIG. 1.
Figure 17:
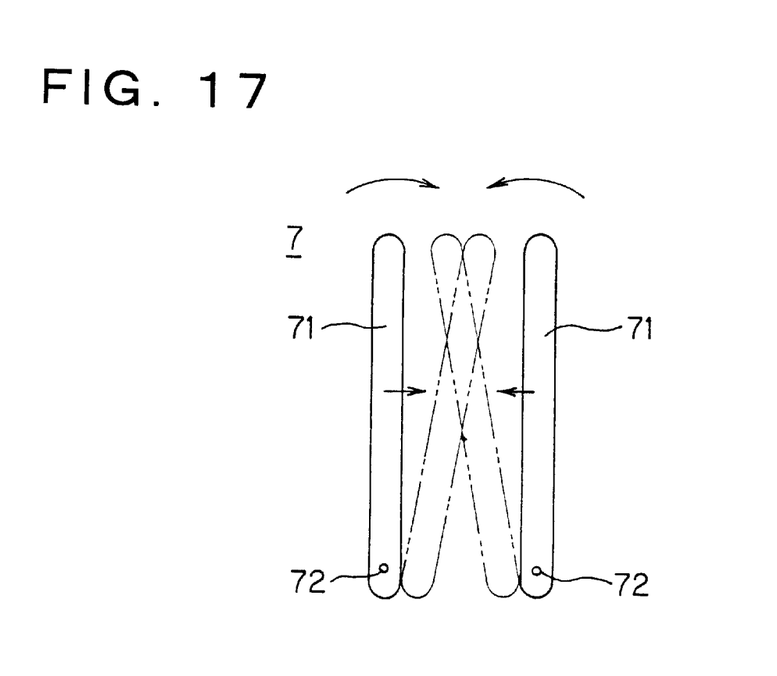
FIG. 17 is a view illustrating further another modification of the nipping members of the holding device as shown in FIG. 1.

As shown in FIG. 16, the holding device 6 may be composed of a pair of nipping members 61, 62, which can move linearly so that their portions forming the taper space approach each other from a condition as shown in solid lines in FIG. 16 to a condition as shown in two-dot chain lines therein. As shown in FIG. 17, the holding device 7 may be composed of a pair of nipping members 71, 71, which can move linearly so as to approach each other, while swinging them around the respective centers of their swing motion, which locate at the longitudinal ends of the nipping members 71, 71. In such a holding device 7, the nipping members 71, 71 swing to cross each other so as to form the taper space between them.

In the above-described embodiment of the present invention, both of the nipping members of the holding device can move. The nipping members are not limited to such a feature and only one of them may be moved.

The bar may be lifted up without lowering the holding device toward the bar. The bar may be lifted up, while lowering the holding device. The movements of them are not limited to the vertical movement and an oblique relative movement of them may be made.

Figure 18:
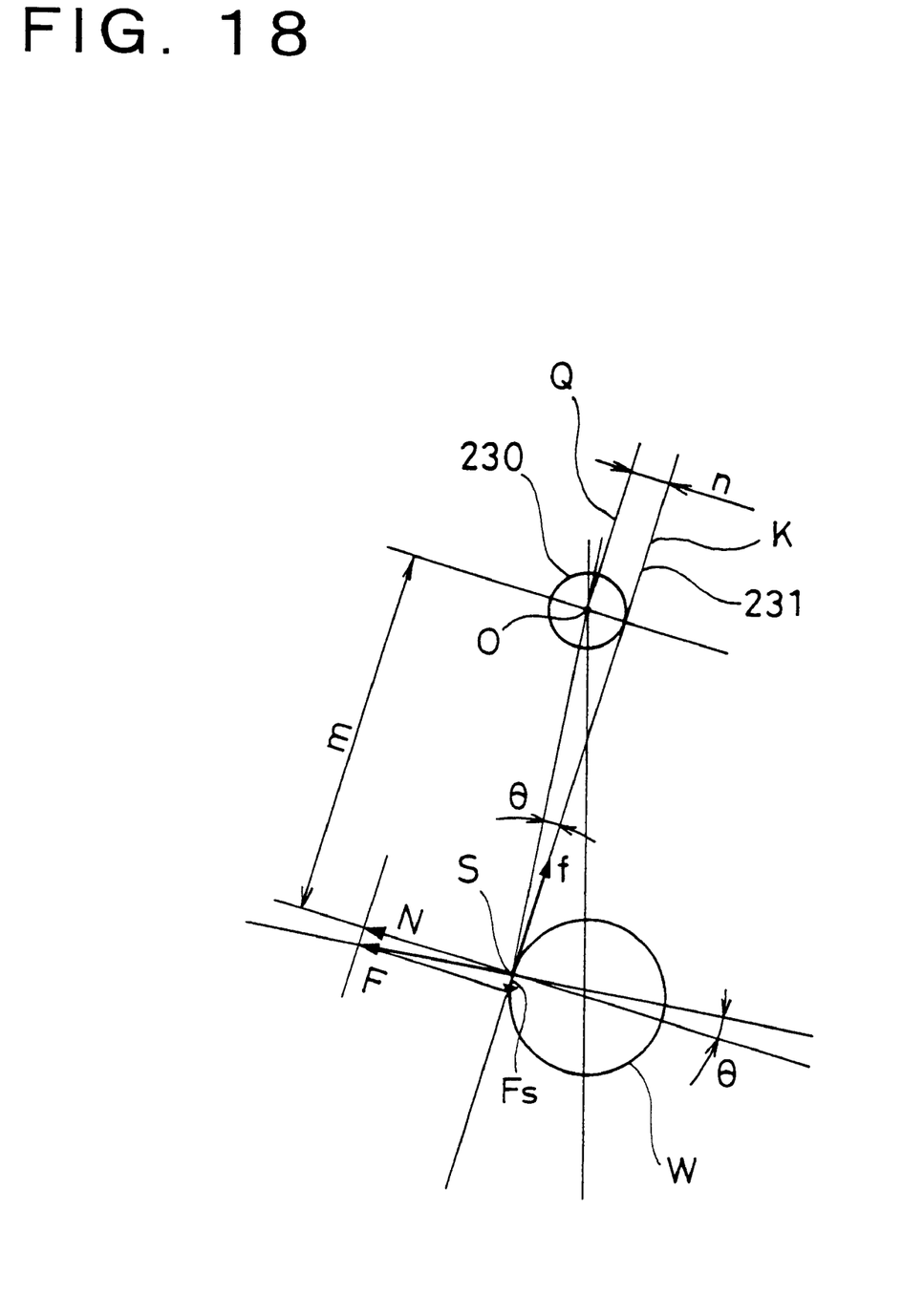
FIG. 18 is a schematic view illustrating a position in which the nipping members nip the single bar.

FIG. 18 shows a position in which the single bar W is nipped by the nipping members of the holding device 23. In FIG. 18, a symbol "m" represents a distance between the central point O of the supporting portion 230 for the swing motion of the holding device 23, on the one hand, and the contact point S of the nipping member with the bar W, on the other hand. A symbol "n" represents a distance between the central point O of the supporting portion 230 for the swing motion and the nipping surface K of the nipping member. A symbol a "θ" represents an angle between a straight line Q connecting the central point O with the contact point S and the nipping surface K. With respect to reaction forces applied to the nipping member by the bar W when the holding device 23 holds the bar W, a symbol "F" represents force in a direction perpendicular to the straight line Q, a symbol "N" represents force in a direction perpendicular to the nipping surface K. With respect to force by which the bar is pressed out through the nipping member 231, a symbol "Fs" represents force in a direction of the nipping surface K. A symbol "$\mu$" represents coefficient of friction between the bar W and the nipping surface K and a symbol "f", represents frictional force.

In view of the balance of force, there may be used the following relational expressions:

$N = F \cos \theta$                       Expression (1)

$f = \mu N$                          Expression (2)

The following relational expression may be obtained from the Expressions (1) and (2):

$f = \mu F \cos \theta$                    Expression (3)

There may also be used the following relational expressions:

$Fs = f$                           Expression (4)

$Fs = F \sin \theta$                    Expression (5)

The following relational expression may be obtained from the Expressions (3), (4) and (5).

$F \sin \theta = \mu F \cos \theta$              Expression (6)

Accordingly, the following relational expression may be obtained:

$\sin \theta / \cos \theta = \tan \theta = \mu$         Expression (7)

When a value of 0.15 is substituted for "$\mu$" of the coefficient of friction, the following relational expression may be obtained:

$\tan \theta = 0.15$

Accordingly, there is maintained an angle θ of about 8.5 degrees between the straight line Q connecting the central point O with the contact point S and the nipping surface K.

"m" and "n" have a relationship of "n/m = tan θ", the following relational expression may be obtained:

$m = n / \tan \theta$                    Expression (8)

When a value of "5" is substituted for "n" of the distance between the central point O of the supporting portion 230 for the swing motion and the nipping surface K of the nipping member, the following relational expression may be obtained:

$m = n / \tan \theta = 5 / 0.149 = 33.5$

Accordingly, the bar W can be nipped at a position apart from the central point O of the supporting portion 230 by a distance of about 33 to 34 mm.

According to the present invention as described in detail, since there is adopted a structure in which the nipping members close so as to press the bars and only the single bar, which remains in the peak portion of the taper space, can be nipped, it is possible to perform an extremely easy extraction of the single bar without spending time and effort and making mechanisms of the apparatus complicated.

It is possible to separate surely the single bar from the remaining bars, even when the bars to be extracted have a small diameter, by which they may easily be entangled with each other.

When the number and/or diameter of the bar received by the holding device are monitored to permit to make determination whether the number and/or diameter of the bar are correct or not, it is possible to prevent an inappropriate bar having a different diameter included in the remaining bars from being extracted, thus ensuring the extraction of the single bar having a prescribed diameter.

It is also possible to move the single bar nipped by the holding device to a place in which a device for carrying out a subsequent step is provided. In addition, it is possible to separate surely the single bar held by the holding device from the remaining bars and to discharge the single bar thus held from the bar. extraction apparatus, thus permitting extraction of the single bar to be worked.

What is claimed is:

1. An apparatus for extracting a single bar from a plurality of bars, comprising;

a holding device for nipping said single bar;

said holding device including nipping members, which face each other and are movable from an open position toward a closing position, said nipping members defining a tapered space formed therebetween, said tapered space having at one end thereof a peak portion located above another wider portion thereof so that only a single bar locating in said peak portion of said tapered space of a plurality of bars received therein can be nipped in response to movement of the nipping members toward the closing position thereof;

a bar separating and discharging device for separating the single bar nipped by said holding device from remaining bars, and discharging said single bar from said apparatus;

said bar separating and discharging device comprising a bar separating device for separating the single bar nipped by said holding device from said remaining bars; and a bar discharging device separately provided from said bar separating device, for discharging said single bar;

said bar separating device having a bar separating member, which is movable from one end of said single bar nipped by said holding device, which is provided at a side of said one end, to the other end thereof, while coming into contact with a lower surface of said single bar; and said bar discharging device having a bar discharging member, which inclines outward and downward, and is swingable.

2. The apparatus according to claim 1 wherein said nipping members are swingably connected at a single point with each other.

3. The apparatus according to claim 1 wherein said nipping members are swingably supported separately from each other.

4. The apparatus according to claim 1 wherein said nipping members are disposed for linear movement toward and away from one another.

5. The apparatus according to claim 1 including a receiver for receiving the plurality of bars, said receiver having opposite ends in a longitudinal direction of said receiver, said holding device being disposed at one of said opposite ends.

6. The apparatus according to claim 5 wherein another of said opposite ends has a width wider than one of said opposite ends.

7. The apparatus according to claim 1 further comprising a sensor for obtaining a number and/or diameter of the bars nipped by said holding device; and a controller for making, on the basis of an output single from said sensor, a determination whether the number or diameter of the bars nipped by said holding device are correct or not, said controller controlling said holding device and to nip a bar again when the number and/or diameter of the bars is determined to be incorrect.

* * * * *